April 9, 1929.  H. J. CHARLTON  1,708,259
VALVE FOR MUSICAL WIND INSTRUMENTS
Filed Jan. 28, 1927

Inventor
Harry J. Charlton
By Nissen + Crane
Attys.

Patented Apr. 9, 1929.

1,708,259

UNITED STATES PATENT OFFICE.

HARRY J. CHARLTON, OF ELKHORN, WISCONSIN, ASSIGNOR TO FRANK HOLTON & COMPANY, OF ELKHORN, WISCONSIN, A CORPORATION OF WISCONSIN.

VALVE FOR MUSICAL WIND INSTRUMENTS.

Application filed January 28, 1927. Serial No. 164,181.

This invention relates to valves for wind instruments by means of which the length of the instrument tube or pipe is varied in producing different notes.

One object of the invention is to provide a valve for the purpose named, which will be substantially free from the effects of wear, which may be more easily and quickly rotated than valves heretofore used, and which will be of improved construction and operation. Other objects will appear from the following description.

The invention is exemplified in the combination and arrangement of parts shown in the accompanying drawing and described in the following specification, and it is more particularly pointed out in the appended claims.

In many forms of wind instruments such as cornets, French horns, and other instruments of similar type, there are provided sections of tubing which may be connected in series with the main wind passage or which may be cut out by a by-pass thus changing the effective length of the air column of the instrument. The insertion or disconnection of the various supplemental tube portions is effected by valves. In the present invention, rotary valves are used for this purpose which have one position for connecting in the supplementary tube and a different position for providing a by-pass to disconnect the supplementary tube.

Figure 1:
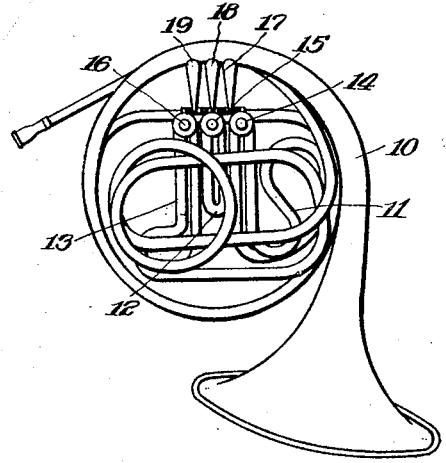
Fig. 1 is a perspective view of one form of instrument equipped with valves such as comprise the present invention.
Figure 2:
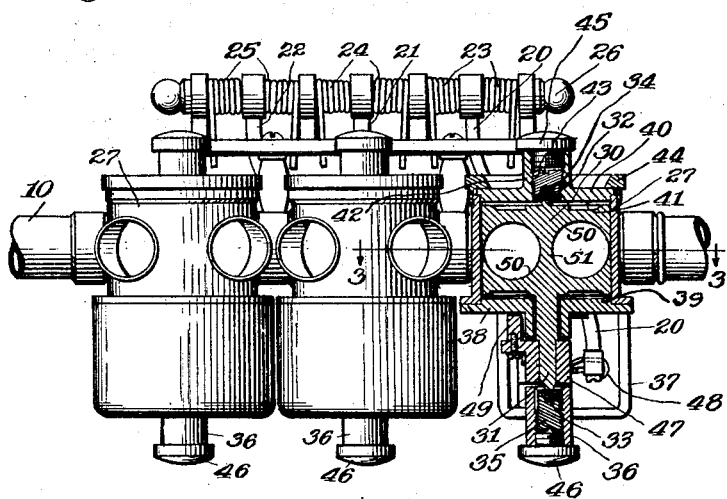
Fig. 2 is an elevation of a set of valves embodying the present invention, one of the valves being shown in section.
Figure 3:
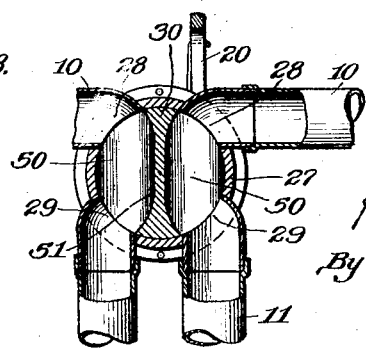
Fig. 3 is a transverse section on line 3—3 of Fig. 2.

The instrument shown in Fig. 1 is known as a French horn and comprises a main tubular wind passage 10 and supplementary tubes 11, 12 and 13 of different lengths which may be inserted in the main wind passage 10 by valves 14, 15 and 16, respectively. The valves are controlled by bell crank levers having finger pieces 17, 18 and 19 and operating shanks 20, 21 and 22. Springs 23, 24 and 25 are connected with each of the bell cranks, respectively, and hold the finger pieces 17, 18 and 19 in their uppermost positions. When the finger pieces are depressed, they will be rotated about their pivotal mounting 26 against the tension of their respective springs. Each of the bell crank shanks is connected with a rotary valve, the construction of which is shown best in Figs. 2 and 3. Each valve comprises a cylindrical sleeve or casing 27 having openings 28 with which the main wind passage 10 of the instrument is connected. A second pair of openings 29 are connected with the supplemental tube 11, 12 or 13 which the particular valve controls. A rotary cylindrical valve 30 is disposed within the cylindrical casing 27 and is nicely fitted within the cylinder so that the periphery of the valve 30 is very closely adjacent the inner surface of the cylinder 27 but not in actual contact therewith. The fitting may be made sufficiently close so that there is substantially no passage of air between the outer surface of the rotary valve and the inner wall of the casing and yet leave the inner cylinder free to rotate without frictional engagement between the two adjacent surfaces.

In order to accurately center the rotary valve 30 and to provide a bearing for the valve which will permit easy and free rotation and yet retain the parts in their accurately centered relation, the valve 30 is provided with bearing pins 31 and 32 which are journaled in jewel bearings 33 and 34, respectively. The bearing 33 is supported by a threaded plug 35 carried by an internally threaded sleeve 36 supported on a spider 37 which is mounted on a cover plate 38 secured to the end of the cylindrical casing 27. The cover plate 38 is provided with a circular projection 39 which extends into the end of the cylindrical casing 27 to center the cover plate and spider relative to the cylinder 27. A second cover plate 40 is provided with a circular projection 41 extending into the other end of the cylinder 27 and a hollow boss 42 is carried by the cover plate 40. A plug 43 is threaded into the boss 42 for supporting the jewel bearing 34. The cover plate 40 is held in place by a threaded cap 44. The end of the boss 42 is closed by a cap 45 which may be removed to permit access to the stud 43, so that the stud may be adjusted by rotating it in its threaded support within the boss 42. A similar cap 46 closes the end of the sleeve 36 to permit adjustment of the stud 35. It will be seen that the valve 30 is supported entirely on the jewel bearings 33 and 34 and is practically free from wear since it has no frictional engagement with any of the other parts of the valve casing. The valve may be accurately adjusted in the direction of the length of its axis by the threaded supports for the jewel bearings and any infinitesimal wear that may occur at the bearings between the ends of the spindles and the jewels may be taken up by adjusting the plugs 35 and 43. The spindle 31 is provided with a squared portion to which a collar 47 is secured about which a cord 48 is wound. The opposite ends of the cord 48 are attached at longitudinally spaced points to the shank 20 so that movement of the shank in either direction will rotate the valve 30. A stop 49 is attached to the sleeve 36 for limiting rotation of the valve. When the valve 30 is in the position shown in Fig. 3, the supplemental pipe section 11 will be connected in the wind passage. When the valve 30 is rotated ninety degrees by the finger piece 17, the two ends of the wind passage 10 will be connected through one of the passages 50 formed in the valve while the supplemental tube 11 will be shut off by the web 51 between the passages 50. The passages 50 will always be maintained in proper registration with the connecting ports 28 and 29 since the valve 30 is not shifted by adjustment for wear, as is necessary in the case of a tapered plug valve. The jewel bearings may be accurately centered to permit sufficiently accurate fitting of the valve within its casing so that the passage of air may be controlled without actual frictional contact between the valve and its casing. The bearings of the valve spindle in their jewel seats may be made substantially frictionless when the parts are accurately adjusted so that the valve rotates practically without frictional resistance. This permits the use of more delicate springs 23 than can be employed where frictional contact is present in the valves, and this, in turn, affords easier operation and quicker response to the operator's fingers.

It will be apparent that changes in details of construction may be made by those skilled in the art without departing from the spirit and scope of the invention as pointed out in the appended claims.

I claim:—

1. A musical wind instrument having a wind passage, a valve for controlling said passage comprising a cylindrical casing, a cylindrical valve disposed within said casing and having a passage therethrough, said casing having ports through the wall thereof for registration with said passage, cover plates for the opposite ends of said casing having projections thereon extending into said casing, journals for said valves at the opposite ends thereof, jewel bearings for supporting said journals, and mountings in said cover plates for supporting said jewel bearings, said mountings being separately adjustable in the direction of the axis of rotation of said valve.

2. A musical wind instrument having a wind passage, and a valve for controlling said passage, said valve comprising a cylindrical casing, cover plates for the opposite ends of said casing, internally threaded sleeves mounted on said cover plates, means for locating said cover plates on said casing to support said sleeves in axial alinement with said casing, plugs threaded in said sleeves, jewel bearings carreid by said plugs, a cylindrical valve disposed within said casing and having spindle bearings at the opposite ends thereof engaging said jewel bearings, and means for closing said sleeves, said closing means being removable to permit access to said plugs for adjusting the same in the direction of the axis of said valve.

3. A wind instrument having a wind passage and a valve for controlling said passage, said valve comprising a cylindrical housing having ports extending through the wall thereof, a cylindrical valve disposed within said housing, and axially disposed jewel bearings for said valve supporting said valve with the periphery thereof adjacent to but free from actual contact with the inner surface of said housing, said valve having a passage for registering with said ports.

4. A musical wind instrument having a wind passage and a valve for controlling said passage, said valve comprising a cylindrical housing, a cylindrical valve disposed within said housing and co-axial therewith, jewel bearings for supporting said valve for rotation about the axis thereof, the periphery of said valve being adjacent to but free from frictional contact with the inner wall of said housing, removable closures for the ends of said housing in which said jewel bearings are mounted, means for locating said closures to position said jewel bearings co-axially with said housing, and mountings for said bearings adjustable in the direction of the axis of said housing.

5. A wind musical instrument having a wind passage, a valve for controlling said passage, and means for mounting the valve with freedom of rotation, comprising an axially projecting spindle on one side of the valve, a cover for the same side of the valve having a sleeve through which said spindle extends, and an adjustable bearing supporting the end of said spindle.

6. A wind musical instrument having a wind passage, a valve for controlling said passage, and means for mounting the valve with freedom of rotation, comprising an axially projecting spindle on one side of the valve, a cover for the same side of the valve having a sleeve through which said spindle extends, a jewel bearing for supporting the end of said spindle, and means for adjusting the posiiton of said jewel bearing.

7. A wind musical instrument having a wind passage, a valve for controlling said passage, and means for mounting the valve with freedom of rotation, comprising an axially projecting spindle on one side of the valve, a cover for the same side of the valve having a sleeve through which said spindle extends, a jewel bearing for supporting the end of said spindle, and means for adjusting the position of said jewel bearing comprising a plug on which the jewel bearing is mounted, and a sleeve in which the plug is threaded.

8. A wind musical instrument having a wind passage, a valve for controlling said passage, and means for mounting the valve with freedom of rotation, comprising an axially projecting spindle on one side of the valve, a cover for the same side of the valve having a sleeve through which said spindle extends, a jewel bearing for supporting the end of said spindle, and means for adjusting the position of said jewel bearing comprising a spider secured to said cover, a sleeve supported by said spider, and a plug threaded in said sleeve and carrying said jewel bearing on the end thereof.

9. A wind musical instrument having a wind passage and a valve for controlling said passage, comprising a casing, a rotary valve in said casing, and means for mounting the valve with freedom of rotation, comprising a relatively short bearing pin projecting axially on one side of the valve, an adjustable plug having a jeweled bearing thereon for said bearing pin, a relatively long bearing pin projecting axially from the opposite side of the valve, and an adjustable plug having a jeweled bearing for said relatively long bearing pin.

10. A wind musical instrument having a wind passage and a valve for controlling said passage, comprising a casing, a rotary valve in said casing, and means for mounting the valve with freedom of rotation, comprising a relatively short bearing pin projecting axially on one side of the valve, an adjustable plug having a jeweled bearing thereon for said bearing pin, a relatively long bearing pin projecting axially from the opposite side of the valve, an adjustable plug having a jeweled bearing for said relatively long bearing pin, a sleeve in which said last-named plug is adjustably mounted, and a spider supporting said sleeve in spaced relation from the valve.

In testimony whereof I have signed my name to this specification on this 21st day of January, A. D. 1927.

HARRY J. CHARLTON.